Dec. 23, 1941.  F. W. KRAMER  2,266,769
MOTOR VEHICLE BODY
Filed July 21, 1939  3 Sheets-Sheet 1
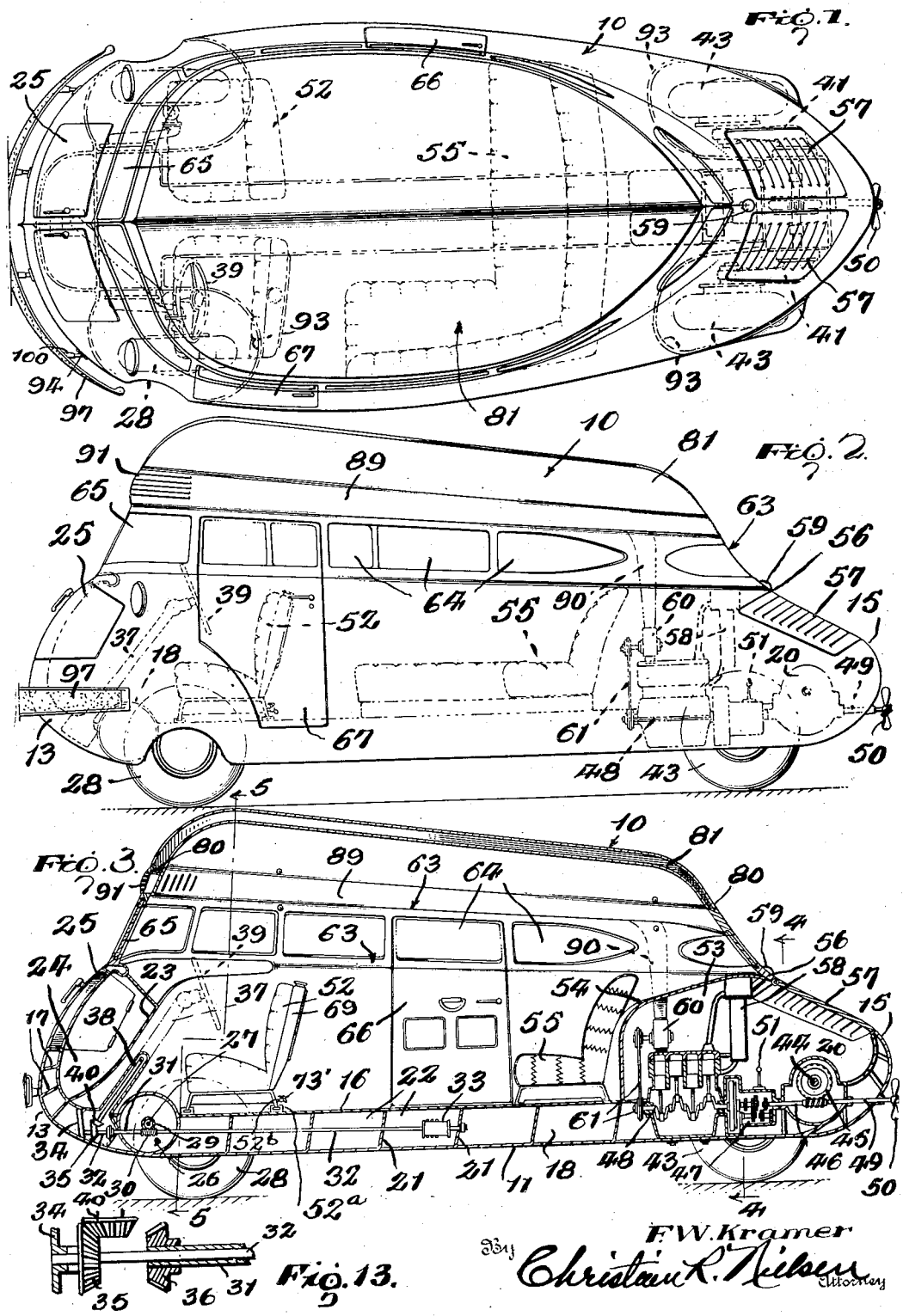
F.W. Kramer
Christian R. Nielsen
Attorney

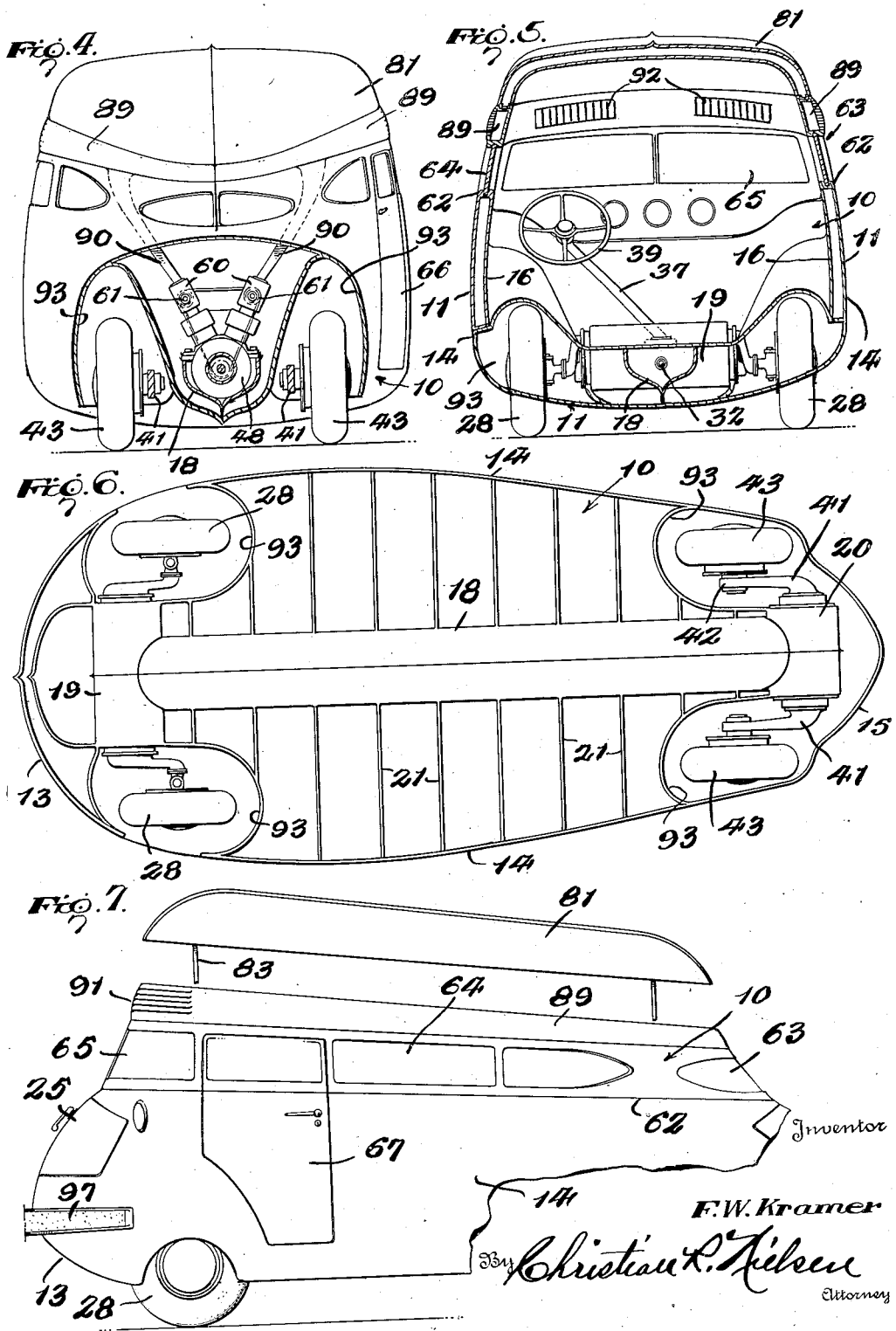

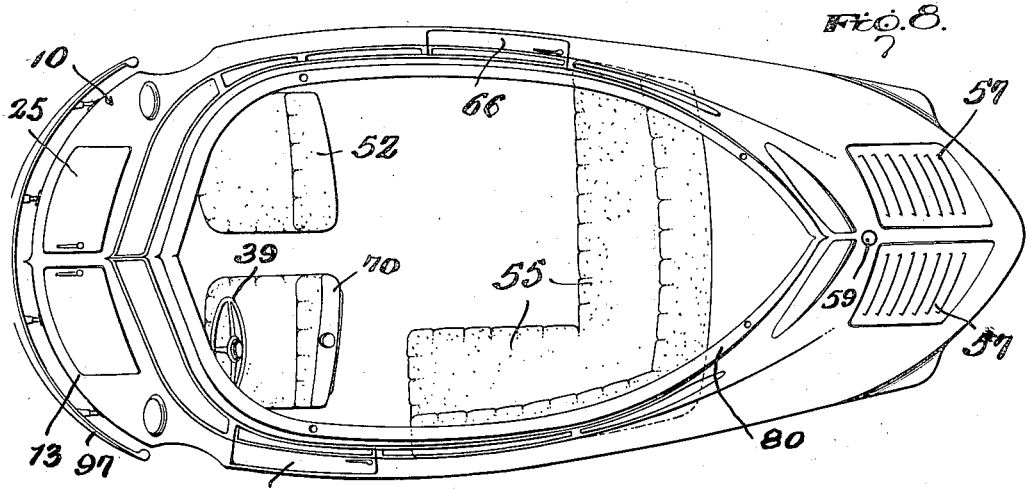
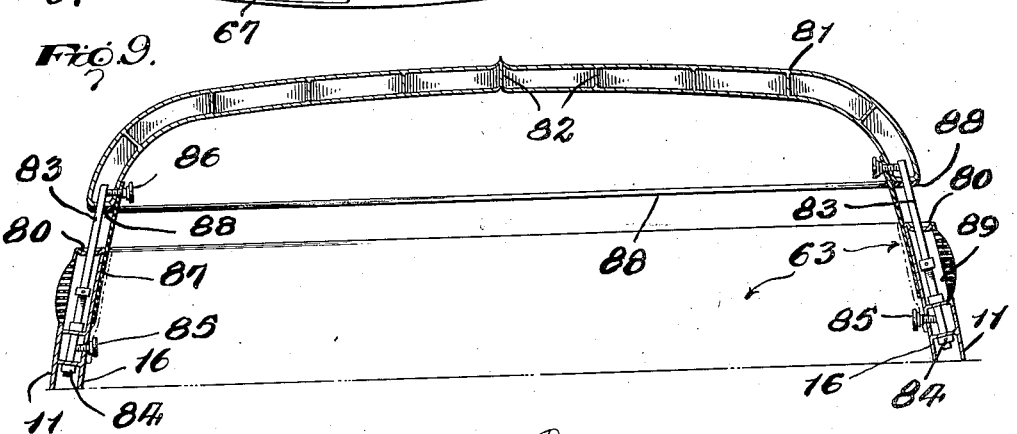
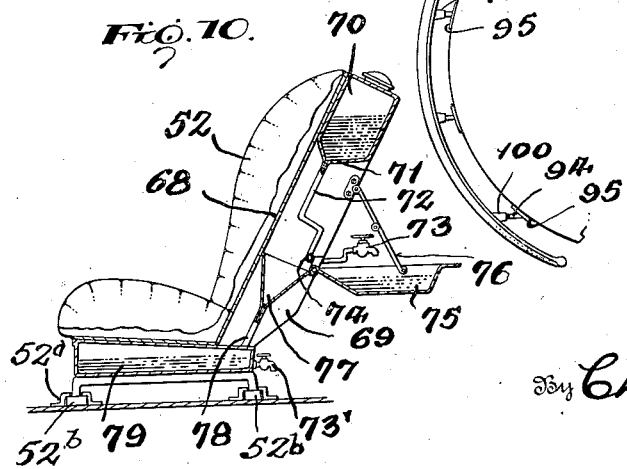

Patented Dec. 23, 1941

2,266,769

UNITED STATES PATENT OFFICE 2,266,769

MOTOR VEHICLE BODY

Fred William Kramer, New Orleans, La.

Application July 21, 1939, Serial No. 285,793

3 Claims. (Cl. 180—1)

This invention relates to motor vehicle bodies and more particularly to a type which may be employed upon land or water, and it consists in the constructions, arrangements and combinations herein described and claimed.

It is an object of the invention to provide a body so designed as to eliminate longitudinal bracing by reason of employment of fins spaced and shaped to give a rigidness to the body throughout.

It is also an object of the invention to construct the body in full streamline effect reducing friction when employed in water and lessening air resistance when travelling upon land.

It is also an object of the invention to provide a body having a double wall hull, greatly adding to the buoyancy when employed as a boat.

It is a further object to provide a novel construction of detachable top which may be employed as a row boat; or when removed, converts the main body into an open air model, or, the top may be vertically adjusted with respect to the main body for the purpose of admitting fresh air to the interior of the body.

It is a still further object of the invention to provide a body in which a forced draft air circulating system may be readily built in as a unitary part of the body operable in conjunction with incoming fresh air, and to provide means whereby when desired, the circulation of air may be diverted to cool the engine of the vehicle.

It is also an object of the invention to provide a novel seat arrangement affording greater room for passengers, as well as permitting installation of accessories which may not be accommodated in present day vehicles.

Additional objects, advantages and features of invention will be apparent from the following description considered in conjunction with the accompanying drawings, wherein Figure 1 is a top plan view of a vehicle constructed in accordance with the invention.

Figure 2 is a side elevation thereof.

Figure 3 is a longitudinal sectional view of the vehicle.

Figure 4 is a vertical cross section on the line 4—4 of Figure 3.

Figure 5 is a similar view on the line 5—5 of Fig. 3.

Figure 6 is a bottom plan view of the vehicle.

Figure 7 is a fragmentary side elevation of the vehicle, showing the top partly removed.

Figure 8 is a top plan view with the top removed.

Figure 9 is an enlarged cross sectional view illustrating the top and its manner of mounting upon the body.

Figure 10 is a fragmentary sectional view of one of the front seats of the vehicle.

Figure 11 is a top plan view of a bumper employed on the vehicle.

Figure 12 is a cross sectional view through one of the mounting studs of the bumper.

Figure 13 is a detail illustrating a control means for steering the front wheels and rudder of the vehicle.

There is illustrated a vehicle generally indicated at 10, and as may be seen from Figure 3, comprises an outer shell 11 which may be readily stamped from a single piece of sheet metal, such as steel, Duralumin, or other material found practicable. In fact, it is quite possible to press the body from plastics such as wood pulp mixed with a suitable binder, or to form the body from plywoods.

The shell 11 has a rounded upwardly turned forward end 13 from which the side walls 14 taper rearwardly to define the rear end, the latter being curved upwardly as at 15.

An inner shell 16 complemental to the shell 11 is provided, maintained in spaced relation by means of fins 17 welded or otherwise secured between the shells.

A channel 18 extends longitudinally and medially of the body, one end being connected to a front wheel-mounting housing 19 extending transversely and the other end being connected to a similar rear wheel-mounting housing 20, as clearly shown in Figure 6. The channel 18 is preferably welded to the wheel housings 19–20.

A plurality of fins 21 extend from the side walls 14 and abut the channel 18, the fins preferably being welded in place.

From the foregoing, it will be seen that a very rigid body structure is provided and by reason of the double wall and connecting fins, a plurality of compartments 22 are formed, affording buoyancy when the vehicle is operated upon water.

Rearwardly of the inner shell 16, at the forward end, a wall 23 is built in, spaced a considerable distance inwardly from the outer shell, forming a compartment 24 for storage of luggage, etc. Access to the compartment is had through doors 25 formed in the fore end of the body.

The body 19 encloses a steering gear mechanism 26 which as here shown comprises a shaft 27 operably connected with suitable levers associated with front wheels 28 to effect turning thereof as is generally understood, the details thereof not being shown. A gear 29 is keyed to the shaft in mesh with a worm gear 30, the latter being carried upon a sleeve shaft 31. The sleeve shaft 31 may be supported in any suitable manner against longitudinal movements, and revolubly mounts a shaft 32, the latter extending rearwardly to a point intermediate the length of the vehicle, the fins 21 forming support for the shaft. Upon the shaft 32 a drum 33 is fixed, the latter having a cable trained therearound, one end being fixed thereto and the other end passing through suitable pulleys or other guide means to a rudder (not shown) fixed at a suitable point at the rear of the vehicle. The rudder will preferably be of a detachable construction so that it may be readily removed when the vehicle is to be used upon the land.

The shaft 32 is supported at its forward end by a bearing plate 34, and spaced rearwardly thereof, a gear 35 is fixed thereon. The sleeve shaft 31 has a gear 36 fixed thereon arranged in opposed relation to the gear 35. A steering gear 37 is provided, mounted medially of the longitudinal axis of the body of the vehicle universally mounted at its base so that the post may be swung to a position before either of the front seats, permitting alternate driving of the vehicle by the passengers occupying the front seats. The post includes a shaft 38, the upper end of which has connected thereto a steering wheel 39 and the lower end has fixed thereon a gear 40. This gear 40 is selectively engageable with gears 35 and 36 for effecting steerage of the wheels 28 or the rudder through the shaft 32 and drum 33.

The housing 20 mounts rear wheel housings 41 respectively, upon the free ends 42 of which there is mounted rear wheels 43 driven through a shaft 44 and associated gear 45, the latter being operatively connected to a driven shaft 46 of a transmission 47, the latter being operatively associated with an engine 48 mounted in a compartment in the rear of the body, as will be described hereinafter.

As may be seen from Figure 6 of the drawings, the rear wheels 43 are mounted to travel in a line of less tread than the front wheels 28 due to the taper or streamline effect of the body, and this necessitates a housing 20 of lesser length than the housing 19, in order to maintain the streamline effect, and it should also be noted that by the construction presented, a vehicle having a low center of gravity is provided, insuring safety in travel upon land or water.

The shaft 46 includes a rear extension 49 upon which there is secured a propeller 50, for propelling the vehicle when in water, and will of course be driven at various speeds provided by the transmission as determined by the positioning of the gear shift lever 51, which may be remotely actuated through suitable levers from the front seats 52.

The front seats 52 are adjustable laterally and to this end I provide trackways 52—a at front and rear extended laterally upon the floor of the vehicle, the seats having heads 52—b complemental to the trackways.

The engine compartment 53 is defined by a wall 54 positioned immediately to the rear of the rear seat 55, the wall extending from the inner shell 16 upwardly and inclined rearwardly for juncture with the wall 56 of the body, and also extends and is secured to the side walls 14. The wall 56 has a pair of openings closed by hinged doors 57, the latter having louvers for ventilation of the engine 48, as well be described in further detail hereinafter. It will be seen that the engine is entirely enclosed and the possibility of exhaust gases getting into the passenger compartment is entirely eliminated, which is enhanced by the fact that any gases which may be present in the engine compartment will pass rearwardly out through the louvers of the doors.

The engine, transmission, etc. may be mounted in the engine compartment in any suitable manner, and as shown, the engine includes a radiator 58 having a filling spout 59 exteriorly of the body. The radiator is positioned in the path of outflowing air, effecting efficient cooling of the radiator.

A pair of exhaust fans 60 are suitably mounted within the engine compartment, driven from the engine by means of pulleys and a belt 61, the fans functioning to draw air from the passenger compartment, as will be explained.

The inner and outer shells 16 and 11 are joined at their upper edges in the form of a circumscribing face 62 upon which a superstructure frame 63 is mounted, as by welding. The frame 63 includes windows 64 along the sides and rear and a windshield 65. The main body and the superstructure are provided with openings for doors, one door 66 being positioned approximately axially of the length of the body, permitting ready passage into the body and particularly to the rear seat 55. The other door 67 is positioned forwardly of the body and slightly to the rear of the left front driver's seat. This door permits access to the front seat, as well as to the rear seat.

The rear seat 55 is substantially L-shaped, one portion extending transversely of the body and another portion lying longitudinally of the body. Such an arrangement of seat affords greater room and comfort to the rear seat passengers, and to afford still greater comfort, one of the front seats 52 is provided with a combined water receptacle and wash basin, constructed in a manner to be readily concealed when not in use, yet movable to operable position in an easy manner. It should be understood that the seat 55 may embody extra cushions or spring mattress for the purpose of providing a full sized double bed.

The seat 52 is constructed with a metallic or other backing 68 having side walls 69, between which there is secured a receptacle 70 for water. The receptacle 70 has a tapered lower end 71 merging into a pipe 72. The pipe 72 has a faucet 73, inwardly of which the pipe is provided with a hinge joint 74. A basin 75 is hingedly connected at its lower end, between the side walls 69, and a hinged link 76 connected between the basin and side walls affords support for the basin in its operative position. Immediately to the rear of the hinge of the basin, a funnel 77 is arranged, adapted to receive water from the basin, when the basin is swung to its closed position between the walls. A conduit 78 extends from the funnel 77 to a waste receptacle 79 positioned beneath the horizontal portion of the seat, the receptacle having a faucet 73' for drawing off water from the receptacle.

The upper edge of the super-structure frame 63 is constructed in the form of a circumscribing groove 80 (see Fig. 9), for seating the top 81. The top 81 is constructed along the lines of a row boat and when detached from the body, may be used as such. The top 81 is of double wall formation reinforced at suitable points by fins 82 which may be arranged between the walls in a manner to form individual compartments which will increase buoyance of the top when employed as a boat.

In order that the top 81 may be readily installed and removed from the superstructure 63, a plurality of suitably spaced rods 83 project through the groove 80, the rods 83 being presented into openings formed in the lower edge of the top 81. The rods 83 may be secured in place by means of a nut 84, and set screw 85. A set or thumb screw 86 threadedly engaged through the inner wall of the top impinges upon the rod 83 for securement of the top. Obviously, the top 81 may be adjusted vertically above the superstructure and maintained in such position by loosening the screws 86, adjusting the top as desired and then tightening the screws. Thus, the top 81 may be adjusted so as to admit fresh air and provision is made for closing the space between the top and superstructure, without readjusting the top by reason of a flexible sheet 87 stretched across the space and secured between the thumb screws 85—86.

Obviously, a weatherproof joint must be provided between the top 81 and the superstructure, and this is accomplished in the provision of a rubber packing strip 88 on the lower edge of the top, adapted to seat within the groove 80 of the superstructure.

An air duct 89 is formed in the superstructure, extending across the front and along the sides of the superstructure, respective side ducts having communication with the exhaust fans 60 by means of ducts 90.

The front portion of the air duct 89 is open to the atmosphere through the provision of louvers 91, and the inner wall forming the duct 89 is provided with shutters 92 for regulating air which may pass into the vehicle body.

From the foregoing, it will be apparent that with the suction fans 60 in operation, fresh air will be drawn through the louvers 91 into the ducts 89 and finally discharged from the fans into the engine compartment, the air serving to cool the motor 48, and finally passing from the compartment by reason of the louvers 57. The air thus passing through the rear of the body tends to break any vacuous effect ordinarily inherent in ordinary constructions of vehicle bodies.

In addition, the shutters 92 may be opened or closed to regulate the amount of air which may be drawn off from the interior of the vehicle body, and an efficient ventilation of the vehicle body, effected.

The wheels 28 and 43 are mounted in respective wells 93, and these are of such size and depth that the wheels may be raised and lowered therewithin to accommodate the vehicle either to land or water. The structure of the wheel mounting and drive are not dealt with in detail herein, since they form no part of the present invention and are fully shown and described in my United States Patent, 2,091,509, issued August 31 1937.

The vehicle may be equipped with bumpers front and rear, as required, and in Figures 11 and 12, I have illustrated a preferred form, attention being directed to these figures for an understanding of the construction. The bumper comprises a plurality of headed stud bolts 94, each having an integral attaching plate 95 for securement to the body by bolts 96. The bumper bar 97 is preferably formed from rubber or other resilient material, which is firmly fixed to a metallic bar or plate 98. As shown in Figure 12, the plate 98 has its longitudinal edges 99 inwardly turned and embedded in the bar 97. The plate 98 has a plurality of sleeves 100, the sleeves being complemental to respective headed bolts 94. The head of the bolt is slidably engaged within the sleeve and the outer end of the sleeve is exteriorly threaded to receive a cap 101, the latter being apertured to receive the bolt 94 slidably therethrough. A helical spring 102 is interposed between the bottom of the sleeve and the head of the bolt. It will thus be seen that the bumper bar is resiliently mounted upon the bolts, and due to such mounting, shocks due to collisions will be materially reduced.

While I have shown and described a preferred construction, this is by way of illustration only, and I consider as my own all such modifications in structure as fairly fall within the scope of the appended claims.

I claim:

1. A vehicle body comprising spaced parallel bottom, side and end walls, fins connecting the opposed walls, the side walls tapering rearwardly, a channel extended longitudinally and medially of the body, fins connecting the channel and side walls, a tubular housing connected to respective ends of the channel, the housing at the rear of the body being of less length than the housing at the front of the body, drive means carried by the shorter housing, steering means carried by the other housing, drive wheels associated with the drive means, traction wheels associated with the steering means, a power plant in the rear of the body and operatively connected with the drive means.

2. A vehicle body comprising spaced parallel bottom, side and end walls, fins connecting the opposed walls, a channel extended longitudinally and medially of the body, fins connecting the channel and side walls defining a plurality of compartments, a right angular disposed housing connected to respective ends of the channel, the housing at the rear of the body being of less length than the housing at the front of the body, drive means carried by the shorter housing, steering means carried by the other housing, drive wheels associated with the drive means, traction wheels associated with the steering means, a power plant in the rear of the body and operatively connected with the drive means.

3. A vehicle comprising spaced parallel bottom, side and end walls, fins connecting the opposed walls forming compartments, a channel extended longitudinally and medially of the body, fins connecting the channel and the side walls, a right angular housing at the ends of the channel, steering gear means in one of the housings, drive means in the other housing, traction wheels operatively associated with the steering gear means, drive wheels operatively connected with the drive means, said body having wells for reception of the wheels and of a depth to permit retraction of the wheels therewithin, a power plant in the rear of the body and operatively connected with the drive means.

FRED WILLIAM KRAMER.